Patented July 15, 1947

2,423,873

UNITED STATES PATENT OFFICE 2,423,873

METHOD FOR PRODUCTION OF INCREASED YIELDS OF PENICILLIN

Robert D. Coghill and Andrew J. Moyer, Peoria, Ill., assignors to United States of America, as represented by the Secretary of Agriculture No Drawing. Application June 17, 1944, Serial No. 540,852

4 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a new and useful method for producing penicillin by the cultivation of molds, whereby the yield of penicillin is substantially increased above that previously obtained.

Although the production of penicillin is now a commercial enterprise, the yield of this valuable antibiotic material per unit volume of employed medium is very low, despite attempts to improve the yield by making numerous variations in the usual constituents of the nutrient medium and in the operating conditions. Accordingly, any means by which substantial increases in yield can be obtained are of great practical significance.

We have found that striking increases in penicillin production are obtained when phenylacetic acid or potential sources of phenylacetate ion, such as salts of phenylacetic acid or esters of phenylacetic acid, are incorporated in the aqueous nutrient medium used for the cultivation of penicillin-producing molds. These compounds are effective at levels ranging from 0.005 to 0.5 gram per 100 ml. of nutrient medium; however, we have observed that concentrations within the range of 0.02 to 0.20 gram per 100 ml. are especially effective. The use of quantities of phenylacetic acid or its salts or esters in excess of 0.20 gram per 100 ml. does not result in proportionately increased yields of penicillin, and, accordingly, we prefer to use concentrations of these compounds within the range 0.02 to 0.20 gram per 100 ml. of nutrient medium.

The results attained by the method of our invention can be realized by adding to the aqueous nutrient medium phenylacetic acid as the free acid, as any of its numerous common salts, such as sodium phenylacetate, potassium phenylacetate, ammonium phenylacetate, calcium phenylacetate, magnesium phenylacetate, strontium phenylacetate, iron phenylacetate, zinc phenylacetate, or manganese phenylacetate, or as any of its numerous esters, such as methyl phenylacetate, ethyl phenylacetate, propyl phenylacetate, butyl phenylacetate, or amyl phenylacetate. The activity of the salts and esters is due to their ionization or hydrolysis, respectively, in the aqueous nutrient media, to yield phenylacetate ion as one of the products of such dissociation. Accordingly, it is within the scope of our invention to use not only phenylacetic acid, but also chemical compounds which yield phenylacetate ion upon dissociation, hydrolysis, or ionization in aqueous media.

We have observed that phenylacetic acid and its salts and esters are toxic to young cultures and that this toxicity is greater when the nutrient medium is at low pH levels than when it is at high pH levels. Thus, phenylacetic acid, its salts, and its esters in concentrations ranging from 0.005 to 0.5 gram per 100 ml. of nutrient media markedly retard the development of penicillin-producing molds when these compounds are added to nutrient media of pH 4.0 to 4.5 at the time the inoculation is made. However, if such quantities of phenylacetic acid, its salts, or its esters are added to one- or two-day-old cultures in which the mold growth has become established, little or no inhibition or toxicity is observed. Likewise, if the pH of the nutrient medium is adjusted by means known to the art, such as by use of any of the common alkaline agents (hydroxides or carbonates of the alkaline or alkaline-earth metals) to within the range pH 4.6 to pH 8.0 before addition of the phenylacetic acid, its salts, or its esters, little or no toxicity or inhibition is observed, even though the addition of the latter compounds may be made at the time of inoculation.

We have observed that although phenylacetic acid, its salts, and its esters inhibit mold growth in freshly inoculated nutrient media possessing a pH of less than 4.6, cultures made on media so treated are usually able to initiate growth after a few days, and eventually will show penicillin yields of higher values than untreated cultures, thus reflecting the efficacy of the added phenylacetic acid or its derivatives. Accordingly, although we prefer to add these compounds under conditions which are designed to avoid inhibition of the fungus growth or its metabolism, our invention is not limited with respect to these conditions.

It is to be noted, therefore, that although some benefit will be derived from adding phenylacetic acid, or its salts, or its esters, to cultures without particular regard to age of the culture or to the hydrogen-ion concentration prevailing in the medium, the most satisfactory results will be obtained if one of the following conditions is adhered to:

(a) Incorporation of phenylacetic acid or its salts or its esters in the nutrient medium prior to inoculation, the pH then being adjusted to within the range 4.6 to 8.0 before the inoculum is added.

(b) Addition of phenylacetic acid or its salts or its esters to cultures in which the mold growth has become well developed.

(c) Addition of phenylacetic acid or its salts or its esters to cultures in such a stage of development that the metabolic processes of the mold have established in the medium a pH within the range 4.6 to 8.0.

We have found phenylacetic acid, its salts, and its esters to be effective in increasing penicillin yields in both surface and submerged fermentation processes, that is, those processes in which the penicillin-producing organisms, such as *Penicillium notatum*, *Penicillium chrysogenum*, or *Aspergillus flavus*, are cultivated as mycelial pads on the surface of a nutrient medium, and those processes in which such molds are forced to grow submerged in the medium through the application of agitation and aeration. Methods and media which can be used to produce penicillin in both surface and submerged cultures are described in co-pending applications for U. S. patent, application Serial Nos. 530,233 and 530,234, filed April 8, 1944.

Phenylacetic acid, its salts, and its esters cause an increase in penicillin production in mold cultures grown on the lactose-steep liquor medium described in U. S. patent application, Serial No. 530,234, filed April 8, 1944; however, the use of this acid and its derivatives according to the method of our invention does not require the above medium, but may be applied to other media which are utilized for penicillin manufacture. For example, a sucrose-steep liquor medium, a molasses-steep liquor medium, or a Czapek-Dox synthetic medium may be used. Also, cultures grown on solid media, such as bran, may be advantageously treated with phenylacetic acid and its salts and its esters, according to the method of our invention.

The manner in which phenylacetic acids, its salts, or its esters are added to the nutrient medium is not critical. When these compounds are to be present during the entire fermentation period, they may be incorporated in the medium before its sterilization. When they are to be added to cultures in which the mold growth has already become established, they may be added as solids or liquids, or as solutions in water or organic solvents.

As illustrative of the method of practising our invention, the following examples are given, although the details of operation herein set forth are to be considered in no way restrictive.

*Example I*

The following medium was prepared, and 50 ml. aliquots were distributed in 200 ml. Erlenmeyer flasks.

|  | Grams per 100 ml. |
|---|---|
| Lactose | 4.0 |
| Corn steeping liquor | 8.0 |
| MgSO₄·7H₂O | 0.025 |
| KH₂PO₄ | 0.050 |
| NaNO₃ | 0.30 |
| ZnSO₄·7H₂O | 0.004 |
| Tap water | To volume |

The medium was adjusted from an original pH value of approximately 4.2 to a pH value of 5.8, by the addition of potassium hydroxide, and was then sterilized by steaming, in the conventional manner. At the time of inoculation with spores of *Penicillium notatum*, phenylacetic acid was added to some of the flasks at the rate of 0.04 and 0.08 gram per 100 ml. Control flasks, containing the above adjusted basic medium but omitting phenylacetic acid, were also included in the test. The flasks were then incubated at 24° C., and surface pellicles of *P. notatum* developed. The following assay values on the medium were obtained by the cup-plate method described by Schmidt and Moyer (J. Bact. 47: 199–210 (1944)).

| Age of culture, days | Penicillin Yield (Oxford units per ml.) | | | | | |
|---|---|---|---|---|---|---|
|  | 3 | 4 | 5 | 6 | 7 | 8 |
| Basic medium only | 37 | 88 | 114 | 131 | 130 | 136 |
| Basic medium+0.04% phenylacetic acid | 63 | 123 | 162 | 189 | 180 | 195 |
| Basic medium+0.08% phenylacetic acid | 47 | 125 | 169 | 189 | 210 | 250 |

The favorable action of phenylacetic acid in increasing the penicillin yield is evident from these data.

*Example II*

A medium similar to that given in Example I was employed for the development of surface cultures of *Penicillium chrysogenum*. However, no pH adjustment was made at the time of inoculation, and phenylacetic acid was not added until the second day, by which time the mold mycelium had become well established and the pH of the medium had risen from an original value of 4.4 to a value of 5.6. The penicillin yields shown by assays made daily on the fourth through the seventh days are shown in the following table:

| Age of culture, days | Penicillin Yield (Oxford units per ml.) | | | |
|---|---|---|---|---|
|  | 4 | 5 | 6 | 7 |
| Basic medium only | 75 | 112 | 100 | 69 |
| Basic medium+0.08% phenylacetic acid | 106 | 193 | 194 | 185 |

The favorable action of phenylacetic acid in increasing the penicillin yield is evident from these data.

*Example III*

Submerged cultures of *P. notatum* were established by growing the organism in 300 ml. Erlenmeyer flasks, each containing 125 ml. of medium. The cultures were shaken continuously at 24° C. on a Ross-Kershaw shaking machine, which imparted to the medium a rotary motion in a horizontal plane. The medium had the composition:

| | | |
|---|---|---|
| Lactose | grams | 27.5 |
| Concentrated corn steeping liquor | ml | 40.0 |
| MgSO₄·7H₂O | grams | 0.125 |
| KH₂PO₄ | do | 0.250 |
| NaNO₃ | do | 1.50 |
| Zinc (as zinc sulfate) | do | 0.005 |
| Distilled water to make | liters | 1.0 |

Inoculation was made with a suspension of germinated spores. The original pH was 4.2; one day after inoculation the pH had risen to 5.6, and at this time phenylacetic acid was added to some cultures at the rate of 0.08 gram per 100 ml. of medium; other cultures were allowed to develop without treatment.

The penicillin yields obtained from the treated and untreated cultures on subsequent days are shown in the following table.

| Age of culture, days | Penicillin Yields (Oxford units per ml.) | | | | |
|---|---|---|---|---|---|
| | 2 | 3 | 4 | 5 | 6 |
| Control (untreated) | 11 | 20 | 60 | 90 | 95 |
| Cultures containing 0.08% phenylacetic acid | 12 | 33 | 85 | 113 | 141 |

The effectiveness of phenylacetic acid in increasing the penicillin yields in submerged mold cultures is thus evident.

Having thus described our invention, we claim:

1. A method for the production of penicillin comprising the cultivation of a penicillin-producing mold on an aqueous nutrient medium containing from 0.005 to 0.50 gram of phenylacetic acid per 100 ml. of nutrient medium, and having a pH of 4.6 to 8.0.

2. A method for the production of penicillin comprising the cultivation of a penicillin-producing mold on an aqueous nutrient medium containing from 0.005 to 0.50 gram of a member selected from the group consisting of phenylacetic acid, salts of phenylacetic acid, and esters of phenylacetic acid per 100 ml. of nutrient medium, and having a pH of 4.6 to 8.0.

3. A method for the production of penicillin comprising cultivating a penicillin-producing mold on an aqueous nutrient medium until the pH of the medium attains a value between pH 4.6 and 8.0, thence adding to the nutrient medium from 0.005 to 0.50 gram of a member selected from the group consisting of phenylacetic acid, salts of phenylacetic acid, and esters of phenylacetic acid per 100 ml. of nutrient medium.

4. A method for the production of penicillin comprising preparing an aqueous nutrient medium, adjusting the nutrient medium to a pH lying within the range 4.6 to 8.0, inoculating the nutrient medium with a penicillin-producing mold and adding to the nutrient medium from 0.005 to 0.50 gram of a member selected from the group consisting of phenylacetic acid, salts of phenylacetic acid, and esters of phenylacetic acid per 100 ml. of nutrient medium.

ROBERT D. COGHILL.
ANDREW J. MOYER.

REFERENCES CITED

The following references are of record in the file of this patent:

UNITED STATES PATENTS

| Number | Name | Date |
|---|---|---|
| 2,168,550 | Zimmerman et al. | Aug. 8, 1939 |
| 2,169,549 | Zimmerman et al. | Aug. 15, 1939 |
| 2,285,708 | Glynn | June 9, 1942 |

OTHER REFERENCES

Moyer et al., section I (c) Monthly Progress Report No. 16, Coghill, Nov. 20, 1943, page 2.